(12) United States Patent
Mundus et al.

(10) Patent No.: US 11,988,558 B2
(45) Date of Patent: May 21, 2024

(54) METHOD AND DEVICE FOR IDENTIFYING INTERFERENCE PIGMENTS IN A COATING (71) Applicant: BASF COATINGS GMBH, Münster (DE)

(72) Inventors: Markus Mundus, Münster (DE); Guido Bischoff, Münster (DE); Thomas Kantimm, Münster (DE); Martin Schmitz, Münster (DE)

(73) Assignee: BASF COATINGS GMBH, Muenster (DE)

(*) Notice: Subject to any disclaimer, the term of this patent is extended or adjusted under 35 U.S.C. 154(b) by 271 days.

(21) Appl. No.: 17/432,609

(22) PCT Filed: Feb. 19, 2020

(86) PCT No.: PCT/EP2020/054381
§ 371 (c)(1),
(2) Date: Aug. 20, 2021

(87) PCT Pub. No.: WO2020/169678
PCT Pub. Date: Aug. 27, 2020

(65) Prior Publication Data
US 2022/0120614 A1   Apr. 21, 2022

(30) Foreign Application Priority Data
Feb. 22, 2019  (EP) .................... 19158943

(51) Int. Cl.
*G01N 21/55* (2014.01)
*G01J 3/46* (2006.01)
(Continued)

(52) U.S. Cl.
CPC ............ *G01J 3/504* (2013.01); *G01J 3/463* (2013.01); *G01N 21/251* (2013.01); *G01N 21/55* (2013.01); *G06T 7/90* (2017.01); *G06T 2207/10024* (2013.01); *G06T 2207/10152* (2013.01); *G06T 2207/30156* (2013.01)

(58) Field of Classification Search
CPC .......... G01J 3/463; G01J 3/504; G01N 21/25; G01N 21/251; G01N 21/55; G06T 2207/10024; G06T 2207/10152; G06T 2207/30156; G06T 7/90
See application file for complete search history.

(56) References Cited

U.S. PATENT DOCUMENTS 6,462,821 B1 * 10/2002 Borton ............... G03G 15/5041
250/353
7,940,396 B2 * 5/2011 Nisper .................... G01J 3/504
356/402
(Continued)

FOREIGN PATENT DOCUMENTS

WO       2018217867 A1    11/2018
WO    WO-2018217867 A1 *  11/2018  ............. B05D 5/065

OTHER PUBLICATIONS

International Search Report for corresponding PCT/EP2020/054381 dated Apr. 17, 2020, 2 Pages.

*Primary Examiner* — Tsung Yin Tsai
(74) *Attorney, Agent, or Firm* — Armstrong Teasdale LLP (57) ABSTRACT

Described herein is a method for identifying an interference pigment in a coating. Also described herein is a corresponding device and a computer-readable medium.

16 Claims, 4 Drawing Sheets

(51) Int. Cl.
    *G01J 3/50*        (2006.01)
    *G01N 21/25*     (2006.01)
    *G06T 7/90*       (2017.01)

(56) References Cited

U.S. PATENT DOCUMENTS

| | | | |
|---|---|---|---|
| 9,905,027 B2* | 2/2018 | Beymore | G01J 3/504 |
| 10,565,740 B2* | 2/2020 | Beymore | G01J 3/463 |
| 10,950,008 B2* | 3/2021 | Beymore | G06T 7/90 |
| 2006/0245632 A1* | 11/2006 | Nisper | G01N 21/55 |
| | | | 382/135 |
| 2010/0159610 A1* | 6/2010 | Sun | G01N 21/78 |
| | | | 436/147 |
| 2014/0295571 A1* | 10/2014 | Sun | G01N 25/20 |
| | | | 436/164 |
| 2016/0003749 A1* | 1/2016 | Sun | G01N 21/4788 |
| | | | 422/82.05 |
| 2017/0200288 A1* | 7/2017 | Beymore | G06T 7/90 |
| 2018/0144505 A1* | 5/2018 | Beymore | G01J 3/463 |
| 2020/0096390 A1* | 3/2020 | Supèr | G01N 21/255 |

* cited by examiner

METHOD AND DEVICE FOR IDENTIFYING INTERFERENCE PIGMENTS IN A COATING

CROSS-REFERENCE TO RELATED APPLICATIONS

This application is a U.S. National Phase Application of International Patent Application No. PCT/EP2020/054381, filed Feb. 19, 2020, which claims priority to European Patent Application No. 19158943.1, filed Feb. 22, 2019, the entire contents of which are hereby incorporated by reference herein.

The invention presented relates to a method and a device for identifying interference pigments in a coating applied to a surface.

Coatings, in particular color coatings, are encountered everywhere: in automobile construction, in architecture, in entertainment electronics and in everyday objects. Such coatings can protect the respectively coated surfaces and enhance the design, and as a result possibly the attractiveness of products, by a variety of color, sheen and glitter effects. With effect pigments, individual, unmistakable color effects can be generated. Moreover, a resistance to weathering effects and UV rays is often achieved as a result.

Exact color coordination of paints of such coatings requires an exact identification of individual pigment types and amounts thereof that are to be used in each case. White, black or color pigments that are present in a finely distributed manner in paints and coatings produced on the basis of paints interact with incident light almost isotropically. This means that their respective reflection spectrum only has a low angle dependence and the color impression produced by the color pigments is almost independent of the illumination angle, at which the surface provided with the coating is illuminated, or the observation angle, at which the surface provided with the coating is viewed or measured.

By contrast with this, a reflection spectrum of an interference pigment that is present in a finely distributed manner in a paint or coating based on a paint generally has most certainly a dependence on the illumination angle at which the light falls on the surface on which a coating comprising the interference pigment has been applied. In this case, the paint, generally containing black, white or color pigments, influences the reflection spectrum of an interference pigment. In addition, such interference pigments can only be detected or observed within a small range of angular divergence about the specular angle. These properties that are inherent in such interference pigments prevent explicit identification of the interference pigments by individual, spectrally resolved pictures or images of a respective coating comprising such interference pigments.

US2017/0200288 A describes a method in which images of a target coating are generated with the aid of a processor, the images thus generated are subjected to an image analysis, sparkle points are thereby identified and their color is determined with the aid of a hue analysis and a sparkle color distribution is statistically calculated. However, a local identification of individual interference pigments is not possible in this way.

An object of the present invention was accordingly to provide a possible way in which even individual interference pigments within a coating can be determined as exactly and easily as possible.

This object is achieved by methods and a device with the features of the independent claims. Refinements of the invention can be taken from the dependent claims and the description.

A method for identifying an interference pigment in a coating is provided, comprising at least the following steps:

illuminating the coating applied to a surface (of a sample platelet) with light at a first illumination angle relative to the normal to the surface, recording a first image of the coating applied to the surface at a first aspecular measurement angle or observation angle, measured in relation to the Bragg angle or specular angle, assigned to the first illumination angle, with reference to the normal to the surface, illuminating the coating applied to the surface with light at at least one second illumination angle, different from the first, relative to the normal to the surface, recording at least one second image of the coating applied to the surface at the first aspecular measurement angle, measured in relation to the Bragg angle or specular angle, assigned to the at least one second illumination angle, with reference to the normal to the surface, or a corrected first aspecular measurement angle, measured in relation to the Bragg angle, assigned to the at least one second illumination angle, wherein the corrected first aspecular measurement angle is obtained from the first aspecular measurement angle by correction in accordance with an optical refraction of the light that has changed at the at least one second illumination angle as compared with the first illumination angle, spatially analyzing and evaluating the first image and the at least one second image, spectrally analyzing and evaluating the first image and the at least one second image, identifying the interference pigment on the basis of the spatial and spectral analysis and evaluation of the first image and the at least one second image, the first and the at least one second illumination angle and the first aspecular measurement angle or the corrected first aspecular measurement angle.

The term "measuring arrangement" is understood in the context of the present disclosure as meaning the entirety of those components of a color-measuring instrument that serve for illuminating with light a measuring spot on the surface of an object to be measured and for capturing the light radiated back from this measuring spot or for capturing the first and the at least one second image. The "normal to the surface" should be understood as meaning a(n) (imaginary) line which is fixed with respect to the equipment, during practical use of the color-measuring instrument is (ideally) perpendicular to the surface of the object to be measured and defines the center point of the measuring spot. The illumination angle or illuminating direction should be understood as meaning the angle or the direction from which the measuring spot is illuminated with light. By analogy, the observing or measuring direction or observation or measurement angle should be understood as meaning the direction or the angle from which the light radiated back from the measuring spot is recorded and measured. The "specular direction" or "Bragg angle" should be understood as meaning the nominal observing direction or observation or measurement angle reflected at the surface of the (planar) object to be measured. When there are a number of possible illuminating directions of a measuring instrument, there are consequently a number of respective specular directions. In relation to a respective specular direction, which is obtained in dependence on the respective illuminating direction, the aspecular observation or measurement angle, at which the first image and the at least one second image are respectively recorded, is in each case measured. The "measuring plane" should be understood as meaning a plane passing through the normal (normal to the instrument) and all of the illuminating directions and the observing directions and also the specular direction. All of the indications of angles relate to directions lying within the measuring plane. An object to be measured is a sample platelet with a coating applied to a surface, wherein the coating comprises pigments (finely) distributed in a carrier material.

According to the method according to the invention, the illumination angle at which the surface or the coating applied to the surface is illuminated, i.e. the angle of incidence (AOI), is accordingly varied while the coating is being both spectrally and spatially evaluated on the basis of the recorded images, i.e. the first image and the at least one second image, with an aspecular observation angle that remains the same or is corrected in accordance with the changed light refraction.

While varying the illumination angle, the spectral variation of the reflection (spectrally resolved analysis) of the individual interference pigments (spatially resolved analysis) is in each case evaluated with an aspecular observation angle that remains the same or is corrected in accordance with the changed light refraction, but, by association, a changed observation or measurement angle, relative to the surface normal. As a result, a respective interference pigment type can be clearly identified. The variation of the spectral reflection or color that accompanies changing of the illumination angle, on account of the changing optical wavelength within the coating comprising the interference pigments, represents a new measured variable for the identification of the respective interference pigments, since a respective interference pigment type displays a characteristic variation of the spectral reflection in dependence on the illumination angle. The respective characteristic variation of the spectral reflection in dependence on the illumination angle that is assigned to the respective interference pigment types is stored in a database. In addition, the respective aspecular observation angles that are characteristic of the respective interference pigment types, possibly together with the range of angular divergence or tolerance about the respective aspecular observation angle that still displays a reflection in each case, may be retrievably stored in the database, assigned to the respective interference pigment types.

As a delimitation from US2017/0200288 A1, in the case of the method according to the invention no statistical distribution of the color of the pigment flakes (pigment platelets) distributed in the paint is determined in order to determine a formulation of the paint, but instead the spectral changes of individual effect pigments are assessed in order to identify individual pigment types.

An interference pigment is an effect pigment of which the effect is predominantly or entirely based on interference of light at thin, highly refractive layers. Incident light is in this case partly reflected at the boundary surface between the interference pigment and the carrier material as a further component part of the coating. The other part is refracted into the interior of the coating. Finally, the remaining or further light is reflected at the boundary surface between the coating and the surface of the substrate or the sample platelet, or a further thin layer in the case of a multilayer system, and then, before leaving the coating, is reflected once again at its surface. Light rays that leave the surface of the coating at the same point have to cover different wavelengths, whereby certain wavelengths are eliminated and others intensified by overlaying. As a result, color is produced in the visible spectral range, to be precise, since the difference of the wavelengths is dependent on the angle of incidence of the light radiating in, i.e. on the illumination angle, an angle-dependent color impression (color flop). In the non-visible spectral range, the effect is generally manifested by detectable angle-dependent wavelengths of the reflected light.

Generally, in the context of the present disclosure, "light" should be understood as meaning both electromagnetic radiation in the visible spectral range and in the non-visible spectral range, for example in the infrared range or in the UV range. This means that the methods according to the invention and the system according invention can be applied or used both in the visible spectral range and in the non-visible spectral range. Interference pigments, which show their effect specifically or inter alia in the infrared range, may be relevant for many kinds of sensor systems, for example in the case of lidar for measuring the range or speed of, for example, vehicles coated with the coating.

Interference pigments often take the form of platelets (flakes), which are oriented in the coating or the paint in a respective direction, which generally does not run parallel to the surface of the coating. In order to reflect incident light at a given illumination angle relative to the normal to the surface of the object to be measured in an intended observing direction, the platelets in the coating or the paint must be oriented in a certain direction, to be specific precisely such that, when it impinges on the respective platelet, the incident light is specularly reflected precisely in the intended observing direction. There are interference pigment types that align themselves well, i.e. parallel or almost parallel to the surface of the object to be measured, and others that align themselves comparatively poorly, i.e. at a clearly measurable angle greater than 0° to the surface of the object to be measured.

According to the invention, it is envisaged to illuminate a surface of the sample platelet that is coated with a coating or a paint of an unknown formulation with light, in particular white light at a certain illumination angle relative to the surface normal, or at an angle of 45° relative to the surface normal ($\theta_{inc}$, cf. FIG. 1). A known conventional clear coat may be applied over the coating of an unknown formulation. Then, with the aid of a sensor or a camera, a spectral radiation that is reflected from the surface of the object to be measured is captured in a spatially resolved manner, in particular in the form of an image, at a certain aspecular measurement angle ($\theta_{as}$, cf. FIG. 1), such as for example as15°, i.e. 15° in relation to the Bragg angle ($\theta_{spec}$, cf. FIG. 1), where "as" stands for "aspecular".

If the coating of an unknown formulation comprises interference pigments, those interference pigments, i.e. their interference pigment platelets, that are aligned in relation to the surface of the test piece in such a way that they reflect specularly in the direction of the aspecular measurement angle (cf. FIG. 1) are visible in the image captured. With knowledge of the refractive indices of the surroundings (typically air, $n_{surroundings}=1$) and the coating surrounding the interference pigment (typically $n_{coating}=1.5$, cf. FIG. 1), it is possible to assign injectively to paired combinations of the illuminating direction (illumination angle) and the observing direction (measurement angle) an orientation $\alpha$ (cf. FIG. 1) in which an interference pigment flake (platelet) must be oriented in the coating or the paint in order to reflect the illumination of the incident light specularly in the observing direction. For the aspecular angle $\theta_{as}$, in which the interference pigment oriented at $\alpha$ in relation to the surface is specularly reflected, the following applies according to FIG. 1 in dependence on the angle of incidence of the light on the surface of the test piece $\theta_{inc}$ (measured relative to the normal):

$$\theta_{as}=\arcsin[n_{coating}/n_{surroundings}*\sin(\arcsin(n_{surroundings}/n_{coating}*\sin(\theta_{inc}))+\alpha)]-\theta_{inc} \quad (1)$$

Figure 1A:
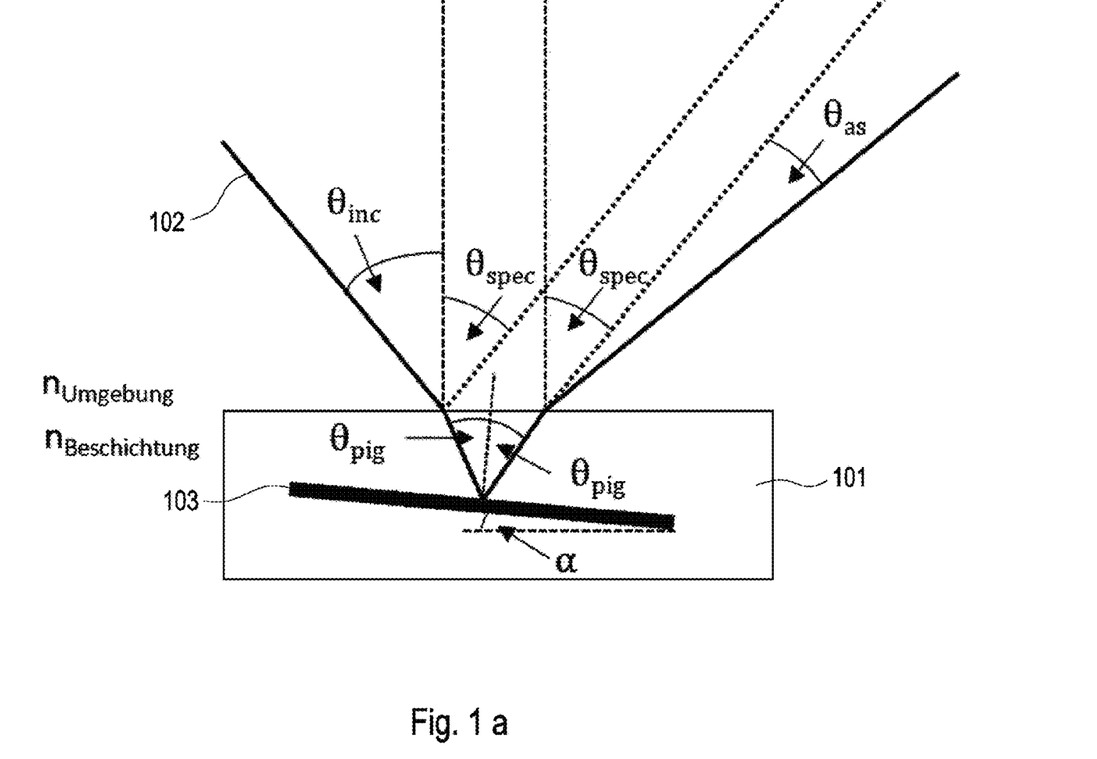
Figure 1B:
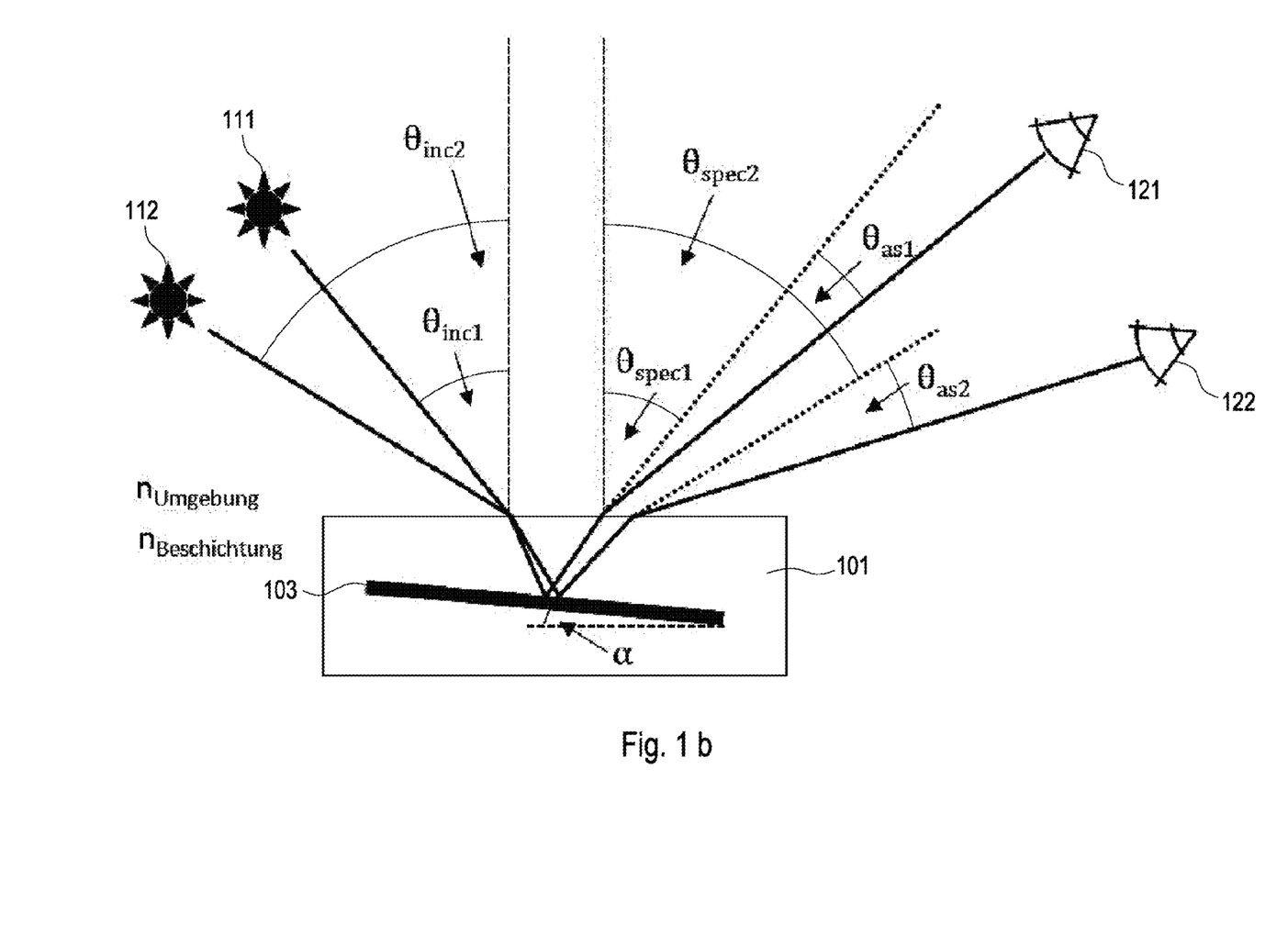

For a changed angle of incidence of the light $\theta_{inc2}$, there is according to the above equation also a change in the observing direction for the specular reflection of the interference pigment oriented at a in relation to the surface (cf. FIG. 1b). However, in first approximation (small angles $\theta$ and $\alpha$), it is so that $\theta_{as1}\approx\theta_{as2}$, and consequently that the interference pigment continues to be specularly reflected at the same aspecular observation angles (cf. FIG. 1c). In addition, the optics of the cameras used have a certain acceptance angle (numerical aperture), so that in practice minor deviations in $\theta_{as}$ can be tolerated.

Accordingly, an individual interference pigment can be measured for various measuring geometries, for example 45as15 and 55as15, while maintaining the aspecular observation angle. If required, the above equation can be used for a correction of the aspecular angle, then resulting in the aforementioned corrected first aspecular angle. Since the aspecular observation angle is (almost) retained when recording the first and the at least one second image, in the at least two measurements, i.e. when recording the first image and the at least one second image, the same interference pigments display specular reflection in the observing direction, and are accordingly visible both in the first image and in the at least one second image. In this case, the specular reflection of the same interference pigments at different illumination angles or angles of incidence is evaluated. It is also possible for more than two different angles of incidence to be used one after the other and the spectral reflection to be evaluated individually and overall. As mentioned above, a respective interference pigment type displays a variation characteristic for it of the specular reflection in dependence on the illumination angle.

In a further step, an illumination angle different from the first angle of incidence or illumination angle is chosen, but the recording of a further image is performed at the (almost) same aspecular angle in relation to the Bragg angle resulting from the illumination angle. This means that the real observation angle relative to the surface normal of the object to be measured must be correspondingly determined and changed.

In a further refinement of the method according to the invention, the step of spectrally analyzing and evaluating comprises deriving a respective remission spectrum for the first and the at least one second image.

In yet a further refinement of the method according to the invention, the deriving of the respective remission spectrum for the first and the at least one second image is carried out by means of a simulation algorithm.

In yet another refinement of the method according to the invention, at least one camera, in particular a multi-angle color camera or a hyperspectral camera, is used for recording the first and the at least one second image.

As already explained above, it is conceivable to record a plurality of second images at a corresponding plurality of second illumination angles of the coating applied to the surface at the first aspecular measurement angle, measured in relation to the Bragg angle, assigned to the respective second illumination angle, or the first aspecular measurement angle corrected according to equation (1).

Furthermore, for identifying a number of different interference pigments, the method may be carried out correspondingly a number of times, while the aspecular measurement angle can likewise be varied a number of times.

The present disclosure also relates to a computer-implemented method for identifying an interference pigment or an interference pigment type in a coating, comprising at least the following steps:

receiving a first image, wherein the first image of the coating applied to a surface (of a sample platelet) was recorded under illumination of the coating applied to the surface with light at a first illumination angle relative to the normal to the surface by an image capturing unit at a first aspecular measurement angle, measured in relation to the Bragg angle, assigned to the first illumination angle, with reference to the normal to the surface, receiving at least one second image, wherein the at least one second image of the coating applied to the surface was recorded under illumination of the coating applied to the surface with light at a second illumination angle, different from the first, relative to the normal to the surface by an image capturing unit at a first aspecular measurement angle, measured in relation to the Bragg angle, assigned to the at least one second illumination angle, with reference to the normal to the surface, or at a corrected first aspecular measurement angle, measured in relation to the Bragg angle, assigned to the at least one second illumination angle, wherein the corrected first aspecular measurement angle is obtained from the first aspecular measurement angle by correction (according to equation (1)) in accordance with an optical refraction of the light that has changed at the at least one second illumination angle as compared with the first illumination angle, carrying out an image analysis for the first and the at least one second image, by using at least one processor, detecting the interference pigment within the first and the at least one second image by a spatially resolved analysis of the images, evaluating, calculating and/or simulating a respective remission spectrum for the first and the at least one second image, identifying the interference pigment or the interference pigment type on the basis of the spatial and spectral analysis and evaluation of the first image and the at least one second image, the first and the at least one second illumination angle and the first aspecular measurement angle or the corrected first aspecular measurement angle.

In addition, the subject matter of the present disclosure is also a device, at least comprising:

a database, a processor, which is in communicational connection with the database and is configured for communicating or exchanging data with the database, wherein the processor is programmed to perform the following steps:

receiving a first image, wherein the first image of a coating applied to a surface (of a sample platelet) was recorded under illumination of the coating applied to the surface with light at a first illumination angle relative to the normal to the surface by an image capturing unit at the first aspecular measurement angle, measured in relation to the Bragg angle, assigned to the first illumination angle, with reference to the normal to the surface, receiving at least one second image, wherein the at least one second image of the coating applied to the surface was recorded under illumination of the coating applied to the surface with light at a second illumination angle, different from the first, relative to the normal to the surface by an image capturing unit at the first aspecular measurement angle, measured in relation to the Bragg angle, assigned to the at least one second illumination angle, with reference to the normal to the surface, or at a corrected (on the basis of equation (1)) first aspecular measurement angle, measured in relation to the Bragg angle, assigned to the at least one second illumination angle, wherein the corrected first aspecular measurement angle is obtained from the first aspecular measurement angle by correction in accordance with an optical refraction of the light that has changed at the at least one second illumination angle as compared with the first illumination angle, carrying out an image analysis for the first and the at least one second image, detecting an interference pigment within the first and the at least one second image by a spatially resolved analysis of the images, evaluating, calculating and/or simulating a respective remission spectrum for the first and the at least one second image, identifying the interference pigment or the interference pigment type on the basis of the spatial and spectral analysis and evaluation of the first image and the at least one second image, the first and the at least one second illumination angle and the first aspecular measurement angle or the corrected first aspecular measurement angle and by comparing with respective characteristic variations of the specular reflection at different illumination angles, i.e. in dependence on the illumination angle, that are stored in the database and are assigned to respective interference pigments (or interference pigment types).

The image capturing unit may be a camera, in particular a color camera or hyperspectral camera, preferably a multi-angle color camera. In the case of a hyperspectral camera, the respective remission spectrum is output directly, and accordingly just has to be evaluated. The image capturing unit may also be a system that operates (also) in the non-visible spectral range, such as for example a multispectral camera (from UV to NIR).

In a refinement, the device according to the invention additionally comprises the image capturing unit, which is in communicational connection with the processor and is configured for recording the first and the at least one second image.

The device according to the invention is configured in particular for performing a method with the features explained above.

The present disclosure also relates to a nonvolatile, computer-readable medium, which comprises a computer program with program coding means which are designed to perform the following steps when the computer program runs on a computing unit, in particular on the processor of the device described above:

receiving a first image, wherein the first image of a coating applied to a surface was recorded under illumination of the coating applied to the surface with light at a first illumination angle relative to the normal to the surface by an image capturing unit at a first aspecular measurement angle, measured in relation to the Bragg angle, assigned to the first illumination angle, with reference to the normal to the surface, receiving at least one second image, wherein the at least one second image of the coating applied to the surface was recorded under illumination of the coating applied to the surface with light at a second illumination angle, different from the first, relative to the normal to the surface by an image capturing unit at the first aspecular measurement angle, measured in relation to the Bragg angle, assigned to the at least one second illumination angle, with reference to the normal to the surface, or at a corrected first aspecular measurement angle, measured in relation to the Bragg angle, assigned to the at least one second illumination angle, wherein the corrected first aspecular measurement angle is obtained from the first aspecular measurement angle by correction (according to equation (1)) in accordance with an optical refraction of the light that has changed at the at least one second illumination angle as compared with the first illumination angle, carrying out an image analysis for the first and the at least one second image, detecting an interference pigment within the first and the at least one second image by a spatially resolved analysis of the images, evaluating, calculating and/or simulating a respective remission spectrum for the first and the at least one second image, identifying the interference pigment or the interference pigment type on the basis of the spatial and spectral analysis and evaluation of the first image and the at least one second image, the first and the at least one second illumination angle and the first aspecular measurement angle or the corrected first aspecular measurement angle and by comparing with respective characteristic variations of the specular reflection that are stored in a database and are assigned to respective interference pigments (or interference pigment types).

The nonvolatile, computer-readable medium is designed in particular to perform a method described above when the computer program is run on a computing unit, in particular on the processor of the device described above.

The invention is schematically represented by exemplary embodiments in the drawing and is further described with reference to the drawing.

FIG. 1 shows in a schematic representation in FIG. 1a a possible measuring geometry for capturing an image of a coating applied to a surface of a sample platelet with pigment platelets comprised therein, in FIG. 1b possible measuring geometries for capturing a first and at least one second image of a coating applied to a surface of a sample platelet with pigment platelets comprised therein and in a diagram in FIG. 1c a dependence of an aspecular observation angle on an alignment of an interference pigment in relation to the surface of the coating;

The method according to the invention, the device according to the invention and the computer program product according to the invention can be used both for auto repair paints for cars or car bodies or body styling parts and for other types of coatings, including colorants and industrial finishes. The embodiments of the invention described below are not intended to be restrictive.

Embodiments of the method according to the invention, the device according to the invention and the computer-readable medium according to the invention can be used in many areas, such as for example for comparing and/or coordinating design and/or fashion products.

Embodiments of the method according to the invention can be at least partly performed by or implemented in a computer system, which may be an independent unit or comprise one or more external terminals or equipment that communicate with a central computer via a network, such as for example the Internet or an intranet.

The computer or processor described in the present disclosure and components coupled therewith or integrated therein may therefore be part of a local computer system or a remote computer or an on-line system or combinations thereof.

The database described in the context of the present disclosure and the computer program described here may be stored or retrievably stored in an internal computer memory or in a nonvolatile computer-readable medium.

Embodiments of the method according to the invention and/or of the device according to the invention use an image capturing unit, which may be for example a multi-angle color camera or a multi-angle multispectral camera, possibly in combination with a spectrophotometer, whereby improved and simplified results for pigment characterization and sample properties can be produced.

The following statement applies to the description of the figures that follows: If individual reference signs are not entered in a figure, reference in this respect is made to the other figures and the associated parts of the description.

The "specular direction" should be understood as meaning the nominal observing direction reflected at the surface of the planar object to be measured, taken from an illuminating direction. A multi-angle color-measuring instrument or generally a multi-angle measuring instrument for measuring a specular variation of a coating in dependence on the illuminating and/or observing (measuring) direction has a number of illuminating directions and a number of observing directions. The measuring plane should be understood as meaning a plane passing through the normal to the instrument and all of the illuminating directions and the observing directions and also the specular direction. All of the indications of angles relate to directions lying within the measuring plane.

FIG. 1a shows in a schematic representation a beam path 102 for an optical beam which enters a coating 101 at an angle $\theta_{inc}$ and is reflected back in the direction of the surface of the object to be measured by an interference pigment 103 that is present in the coating and is aligned non-parallel to the coating surface. The object to be measured corresponds in this case to a sample platelet with a coating applied to a sample platelet surface.

According to the invention, it is envisaged to illuminate a surface of the sample platelet that is coated with a coating 101 or a paint of an unknown formulation with light, in particular white light at a certain illumination angle relative to the surface normal, for example at an angle $\theta_{inc}$ of 45° relative to the surface normal. A known conventional clear coat may be applied over the coating 101 of an unknown formulation. Then, with the aid of a sensor or a camera, a spectral radiation that is reflected from the surface of the object to be measured is captured in a spatially resolved manner, in particular in the form of an image, at a certain aspecular measuring angle $\theta_{as}$, such as for example as15°, i.e. 15° in relation to the Bragg angle $\theta_{spec}$, where "as" stands for "aspecular".

If the coating of an unknown formulation comprises interference pigments 103, those interference pigments 103, i.e. their interference pigment platelets, that are aligned in relation to the surface of the object to be measured in such a way that they reflect specularly in the direction of the aspecular measurement angle $\theta_{as}$ are visible in the image captured. With knowledge of the refractive indices of the surroundings (typically air, $n_{surroundings}=1$) and the coating surrounding the interference pigment (typically $n_{coating}=1.5$), it is possible to assign injectively to paired combinations of the illuminating direction $\theta_{inc}$ (illuminating angle) and aspecular measuring angle $\theta_{as}$ an orientation $\alpha$ in which an interference pigment flake (platelet) must be oriented in the coating 101 or the paint in order to reflect the illumination or the incident light 102 specularly ($\theta_{pig}$) in the observing direction $\theta_{spec}+\theta_{as}$. For the aspecular angle $\theta_{as}$, in which the interference pigment 103 oriented at a in relation to the surface is specularly ($\theta_{pig}$) reflected, the following applies according to FIG. 1a in dependence on the angle of incidence of the light on the surface of the object to be measured $\theta_{inc}$ (measured in relation to the normal):

$$\theta_{as} = \arcsin[n_{coating}/n_{surroundings} * \sin(\arcsin(n_{surroundings}/n_{coating} * \sin(\theta_{inc})) + \alpha)] - \theta_{inc} \quad (1)$$

FIG. 1b shows two possible measuring geometries for capturing a first and a second image of the coating 101 applied to a surface of an object to be measured with pigment platelets 103 comprised therein, only one pigment platelet being shown here for the sake of simplicity. A first measuring geometry comprises an illumination at a position 111, which illuminates the coating 101 at a first angle of incidence $\theta_{inc1}$, and a camera at a position 121, which records a first image of the coating 101 at a first aspecular angle $\theta_{as1}$, measured in relation to the Bragg angle $\theta_{spec1}$, assigned to the first angle of incidence $\theta_{inc1}$ or in a first observing direction $\theta_{as1}+\theta_{spec1}$. A second measuring geometry comprises an illumination at a position 112, which illuminates the coating with light at a second angle of incidence $\theta_{inc2}$, and a camera at a position 122, which records a second image in a second observing direction $\theta_{as1}+\theta_{spec2}$, wherein, with a changing angle of incidence $\theta_{inc2}$, the Bragg angle $\theta_{spec2}$ also correspondingly changes but the aspecular angle $\theta_{as2} \approx \theta_{as1}$ remains almost the same.

For an angle of incidence $\theta_{inc2}$ of the light that is changed with respect to a first angle of incidence $\theta_{inc1}$, it is accordingly the case, on the basis of the above equation (1) for the specular reflection of the interference pigment 103 oriented at $\alpha$ in relation to the surface with respect to a first observing direction $\theta_{as1}+\theta_{spec1}$ assigned to the first angle of incidence $\theta_{inc1}$, that also the observing direction $\theta_{as2}+\theta_{spec2}$ changes. However, in first approximation (small angles $\theta$ and $\alpha$), it is so that $\theta_{as1} \approx \theta_{as2}$, and consequently that the interference pigment 103 continues to be aspecularly reflected at the same aspecular measurement angle (cf. FIG. 1c). In addition, the optics of the cameras used have a certain acceptance angle (numerical aperture), so that in practice minor deviations in $\theta_{as}$ can be tolerated.

Figure 1C:
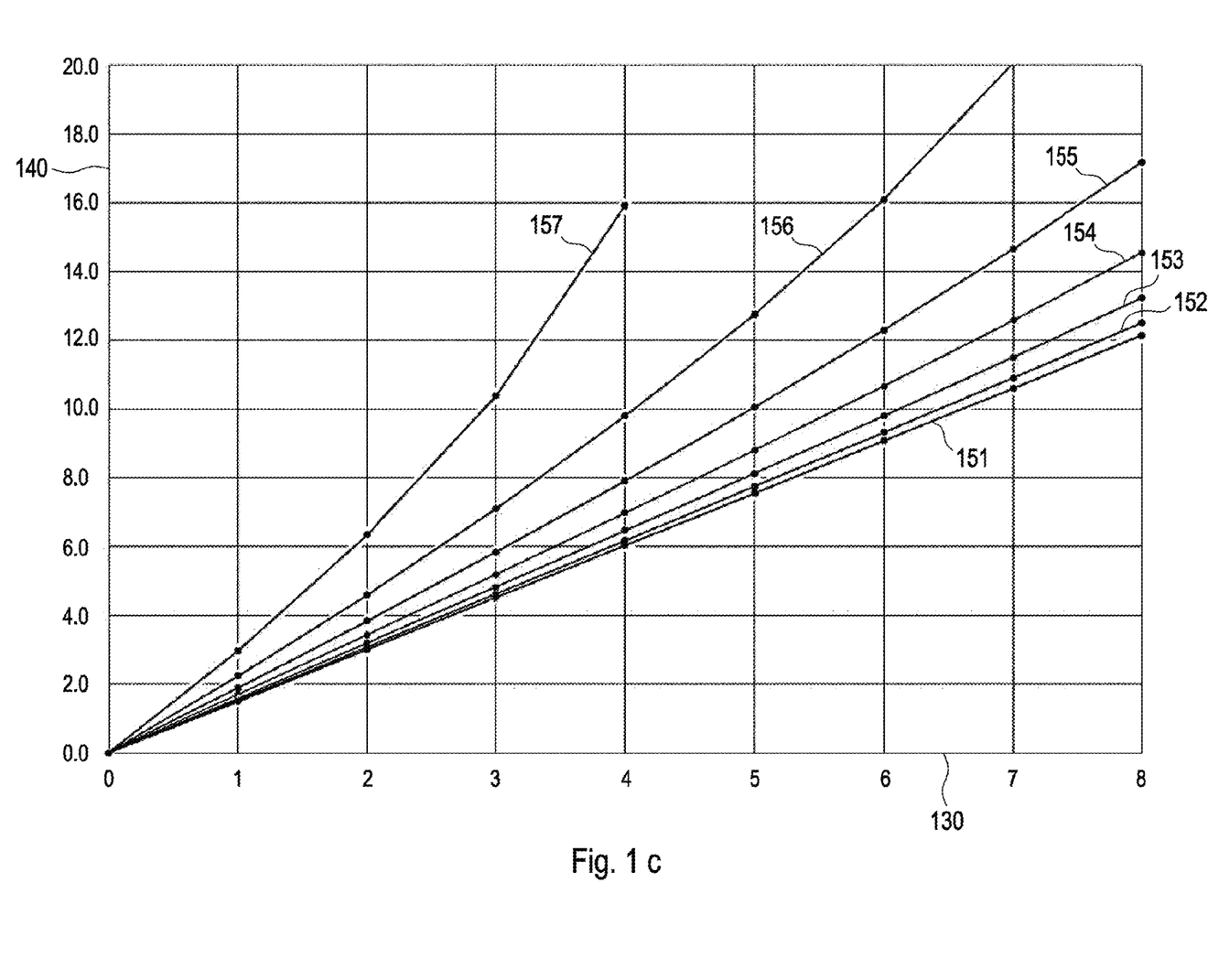

FIG. 1c shows the dependence of the aspecular observation angle $\theta_{as}$ for specular reflection of an interference pigment located in a coating on the alignment $\alpha$ of the interference pigment in relation to the coating surface or the surface of the object to be measured for various illumination angles $\theta_{inc}$. The alignment $\alpha$ of the interference pigment is indicated in angular degrees [°] on an x axis. The Bragg angle of the interference pigment, i.e. the aspecular angle $\theta_{as}$, is indicated in angular degrees [°] on a y axis. Curve 151 shows the dependence at an illumination angle $\theta_{inc}$ of 5°, curve 152 shows the dependence at an illumination angle $\theta_{inc}$ of 15°, curve 153 shows the dependence at an illumination angle $\theta_{inc}$ of 25°, curve 154 shows the dependence at an illumination angle $\theta_{inc}$ of 35°, curve 155 shows the dependence at an illumination angle $\theta_{inc}$ of 45°, curve 156 shows the dependence at an illumination angle $\theta_{inc}$ of 55°, curve 157 shows the dependence at an illumination angle of $\theta_{inc}$ of 65°.

Figure 2:
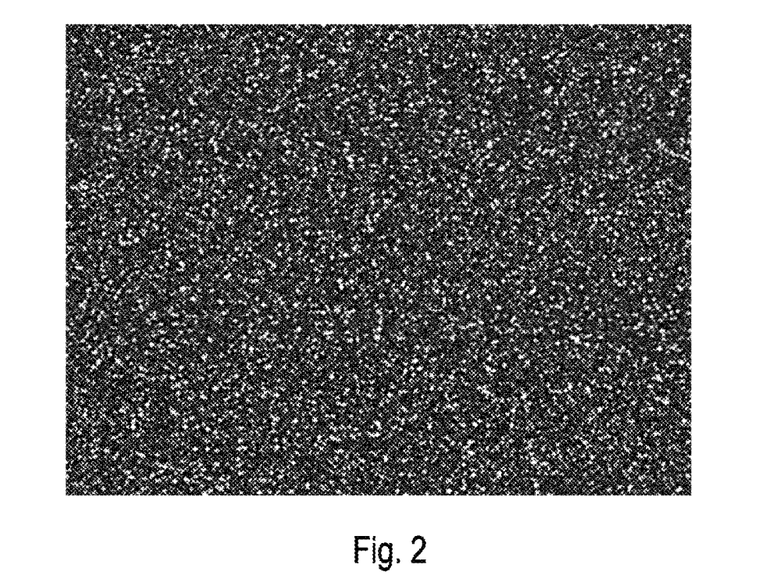
FIG. 2 shows an image of a coating recorded by a camera, recorded at an aspecular measurement angle measured in relation to the Bragg angle assigned to the illumination angle chosen here.

FIG. 2 shows an image recorded by a camera as part of an embodiment of the device according to the invention. In this case, a surface of an object to be measured which comprises a sample platelet on the surface of which a coating comprising interference pigments has been applied was illuminated with white collimated light at a predetermined angle of incidence. The camera with which the image was recorded was in this case arranged at a prescribed aspecular angle in relation to the Bragg angle, given by the angle of incidence, with reference to the normal to the surface. The sparkle points visible here give an indication of interference pigments comprised by the coating, which generally take the form of interference pigment flakes or platelets finely distributed in the coating. In a next step, another, further image, i.e. a second image, is recorded, wherein in this case the surface of the sample platelet coated with the coating is illuminated at another, second angle of incidence and the recording of the image is however recorded at the same first aspecular angle, or the first aspecular measuring angle corrected for optical refraction at boundary surfaces, in relation to the Bragg angle given by the second angle of incidence. Since the aspecular angle is (almost) retained when recording the second image, the same interference pigments within the coating display specular reflection in the direction of the camera, and are consequently visible in both images. On the basis of the (at least almost) retained aspecular angle in relation to the Bragg angles resulting from the respective angles of incidence, the orientation of the interference pigment flakes visible in the respective images, i.e. in the first and the at least one second image, can be derived. After analysis of the respective images, it is therefore possible on the basis of the characteristic variation, which can be derived from the images, of the spectral reflection in dependence on the angle of incidence to clearly infer the interference pigment type with the aid of the database.

Figure 3:
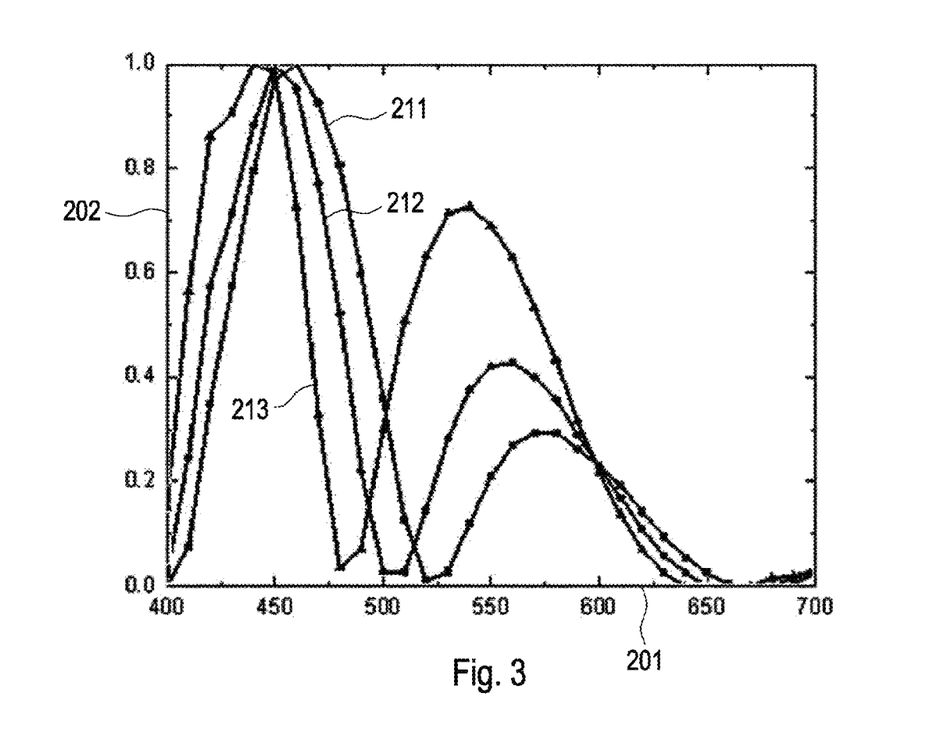
FIG. 3 shows simulated and normalized remission spectra of a $TiO_2$ coating in the case of measuring geometries with various illumination angles and an aspecular measurement angle that is (almost) fixed in relation to the respective illumination angles.

FIG. 3 shows simulated and normalized reflection spectra of an individual TiO$_2$-coated mica platelet, embedded in a standard matrix (constant refractive index n=1.5), for measuring geometries with various angles of incidence. The wavelength of the reflected light is in this case plotted in nanometers on an x axis 201. The normalized reflection is plotted on a y axis 202. The reflection spectrum 211 shows the light reflected from the coated mica platelets (=object to be measured) at an angle of incidence of 25° and a measurement angle of 15° aspecularly in relation to the Bragg angle resulting from the angle of incidence. In this case, a strong reflection can be seen in the region of 460 nm and a smaller local maximum in the region of 575 nm. The reflection spectrum 212 shows the light reflected from the coated mica platelet or its surface at an angle of incidence of 45° and the retained aspecular angle of 15°, measured in relation to the Bragg angle resulting from the angle of incidence. Here, the reflection maximum lies in the region of 450 nm and a smaller local maximum in the region of 560 nm. The reflection spectrum 213 was recorded for an angle of incidence of 65°, wherein the measuring instrument provided for recording the reflection spectrum was arranged at an aspecular angle of 15°. Here, a reflection maximum is obtained in the region of 440 nm and a smaller local maximum in the region of 540 nm. When evaluating the resultant reflection spectra, in particular when considering the variation/change of the spectral reflection or of the spectral reflection profile, which can be derived from the reflection spectra, in dependence on the angle of incidence, which is in each case characteristic of a respective interference pigment type, an interference pigment displaying precisely this reflection profile or precisely this variation can be clearly inferred.

The invention claimed is:

1. A method for identifying an interference pigment (103) in a coating (101), comprising at least the following steps:

illuminating the coating (101) applied to a surface with light at a first illumination angle ($\theta_{inc1}$) relative to the normal to the surface, recording a first image of the coating (101) applied to the surface with light at a first aspecular measuring angle ($\theta_{as1}$), measured in relation to the Bragg angle ($\theta_{spec}$), assigned to the first illumination angle ($\theta_{inc1}$);, illuminating the coating (101) applied to the surface at at least one second illumination angle ($\theta_{inc2}$) different from the first, relative to the normal to the surface, recording at least one second image of the coating (101) applied to the surface at the first aspecular measurement angle, measured in relation to the Bragg angle ($\theta_{spec2}$), assigned to the at least one second illumination angle ($\theta_{inc2}$), or a corrected first aspecular measurement angle ($\theta_{as2}$), measured in relation to the Bragg angle ($\theta_{spec2}$), assigned to the at least one second illumination angle ($\theta_{inc2}$) wherein the corrected first aspecular measurement angle ($\theta_{as2}$) is obtained from the first aspecular measurement angle ($\theta_{as1}$) by correction in accordance with an optical refraction of the light that has changed at the at least one second illumination angle ($\theta_{inc2}$) as compared with the first illumination angle ($\theta_{inc1}$), spatially analyzing and evaluating the first image and the at least one second image, spectrally analyzing and evaluating the first image and the at least one second image, and identifying the interference pigment (103) on the basis of the spatial and spectral analysis and evaluation of the first image and the at least one second image, the first and the at least one second illumination angle ($\theta_{inc1}$, $\theta_{inc2}$) and the first aspecular measurement angle ($\theta_{as1}$) or the corrected first aspecular measurement angle ($\theta_{as2}$);

wherein the aspecular angle is calculated according to the following formula:

$$\theta_{as} = \arcsin[n_{coating}/n_{surroundings} * \sin(\arcsin(n_{surroundings}/n_{coating} * \sin(\theta_{inc})) + \alpha)] - \theta_{inc}.$$

2. The method as claimed in claim 1, in which the step of spectrally analyzing and evaluating comprises deriving a respective remission spectrum for the first and the at least one second image.

3. The method as claimed in claim 2, in which the deriving of the respective remission spectrum for the first and the at least one second image is carried out by means of a simulation algorithm.

4. The method as claimed in claim 1, in which at least one camera is used for recording the first and the at least one second image.

5. The method as claimed in claim 4, in which the at least one camera is a multi-angle color camera and/or a hyperspectral camera and/or a camera system equivalent thereto.

6. The method as claimed in claim 4, in which the at least one camera is a system also operating in the non-visible spectral range.

7. The method as claimed in claim 1, in which a plurality of second images at a corresponding plurality of second illumination angles of the coating applied to the surface are recorded at the first aspecular measurement angle or the corrected first aspecular measurement angle, in each case measured in relation to the Bragg angle assigned to the respective second illumination angle.

8. The method as claimed in claim 1, which for identifying a number of pigments, is carried out correspondingly a number of times, while the aspecular measurement angle is likewise correspondingly varied a number of times, whereas, for identifying one interference pigment in each case, the respective aspecular measurement angle is kept constant or is just corrected in accordance with the optical refraction of the light that has changed at the at least one second illumination angle as compared with the first illumination angle.

9. A computer-implemented method for identifying an interference pigment (103) in a coating (101), comprising at least the following steps:
receiving a first image, wherein the first image of a coating (101) applied to a surface was recorded under illumination of the coating (101) applied to the surface with light at a first illumination angle ($\theta_{inc1}$) relative to the normal to the surface by an image capturing unit at a first aspecular measurement angle ($\theta_{as}$), measured in relation to the Bragg angle ($\theta_{spec1}$) assigned to the first illumination angle,
receiving at least one second image, wherein the at least one second image of the coating (101) applied to the surface was recorded under illumination of the coating (101) applied to the surface with light at a second illumination angle ($\theta_{inc2}$) different from the first, relative to the normal to the surface by an image capturing unit at the first aspecular measurement angle, measured in relation to the Bragg angle ($\theta_{spec2}$), assigned to the at least one second illumination angle ($\theta_{inc2}$), or at a corrected first aspecular measurement angle ($\theta_{as2}$), measured in relation to the Bragg angle, assigned to the at least one second illumination angle, wherein the corrected first aspecular measurement angle ($\theta_{as2}$) is obtained from the first aspecular measurement angle ($\theta_{as1}$) by correction in accordance with an optical refraction of the light that has changed at the at least one second illumination angle ($\theta_{as2}$) as compared with the first illumination angle ($\theta_{as1}$),
carrying out an image analysis for the first and the at least one second image, by using at least one processor,
detecting the interference pigment (103) within the first and the at least one second image by a spatially resolved analysis of the images,
evaluating, calculating and/or simulating a respective remission spectrum for the first and the at least one second image, and
identifying the interference pigment (103) on the basis of the spatial and spectral analysis and evaluation of the first image and the at least one second image, the first and the at least one second illumination angle ($\theta_{inc1}$, $\theta_{inc2}$) and the first aspecular measurement angle ($\theta_{as1}$) or the corrected first aspecular measurement angle ($\theta_{as2}$);
wherein the aspecular angle is calculated according to the following formula:

$$\theta_{as}=\arcsin[n_{coating}/n_{surroundings}*\sin(\arcsin(n_{surroundings}/n_{coating}*\sin(\theta_{inc}))+\alpha)]-\theta_{inc}.$$

10. A device, at least comprising:
a database, and
a processor, which is in communicational connection with the database and is configured for exchanging data with the database, wherein the processor is programmed to perform the following steps:
receiving a first image, wherein the first image of a coating (101) applied to a surface was recorded under illumination of the coating (101) applied to the surface with light at a first illumination angle ($\theta_{inc1}$) relative to the normal to the surface by an image capturing unit at a first aspecular measurement angle ($\theta_{as}$), measured in relation to the Bragg angle ($\theta_{spec1}$) assigned to the first illumination angle ($\theta_{inc1}$),
receiving at least one second image, wherein the at least one second image of the coating (101) applied to the surface was recorded under illumination of the coating (101) applied to the surface with light at a second illumination angle ($\theta_{inc2}$), different from the first, relative to the normal to the surface by an image capturing unit at the first aspecular measurement angle, measured in relation to the Bragg angle ($\theta_{spec2}$), assigned to the at least one second illumination angle ($\theta_{inc2}$), or at a corrected first aspecular measurement angle ($\theta_{as2}$), measured in relation to the Bragg angle ($\theta_{spec2}$), assigned to the at least one second illumination angle ($\theta_{inc2}$), wherein the corrected first aspecular measurement angle ($\theta_{as2}$) is obtained from the first aspecular measurement angle ($\theta_{as1}$) by correction in accordance with an optical refraction of the light that has changed at the at least one second illumination angle ($\theta_{inc2}$) as compared with the first illumination angle ($\theta_{inc1}$),
carrying out an image analysis for the first and the at least one second image,
detecting the interference pigment (103) within the first and the at least one second image by a spatially resolved analysis of the images,
evaluating, calculating and/or simulating a respective remission spectrum for the first and the at least one second image, and
identifying the interference pigment (103) on the basis of the spatial and spectral analysis and evaluation of the first image and the at least one second image, the first and the at least one second illumination angle ($\theta_{inc1}$, $\theta_{inc2}$) and the first aspecular measurement angle ($\theta_{as1}$) or the corrected first aspecular measurement angle ($\theta_{as2}$);
wherein the aspecular angle is calculated according to the following formula:

$$\theta_{as}=\arcsin[n_{coating}/n_{surroundings}*\sin(\arcsin(n_{surroundings}/n_{coating}*\sin(\theta_{inc}))+\alpha)]-\theta_{inc}.$$

11. The device as claimed in claim 10, which additionally comprises the image capturing unit, which is in communicational connection with the processor and is configured for recording the first and the at least one second image.

12. The device as claimed in claim 10, which is configured for performing a method as claimed in claim 1.

13. The device as claimed in claim 10, which is configured for performing a method as claimed in claim 9.

14. A nonvolatile, computer-readable medium, which comprises a computer program with program coding means which are designed to perform the following steps when the computer program runs on the processor of the device as claimed in claim 10:

receiving a first image, wherein the first image of a coating (101) applied to a surface was recorded under illumination of the coating (101) applied to the surface with light at a first illumination angle ($\theta_{inc1}$) relative to the normal to the surface by an image capturing unit at a first aspecular measurement angle ($\theta_{as}$), measured in relation to the Bragg angle ($\theta_{spec1}$) assigned to the first illumination angle ($\theta_{inc1}$), receiving at least one second image, wherein the at least one second image of the coating (101) applied to the surface was recorded under illumination of the coating (101) applied to the surface with light at a second illumination angle ($\theta_{inc2}$), different from the first, relative to the normal to the surface by an image capturing unit at the first aspecular measurement angle, measured in relation to the Bragg angle ($\theta_{spec2}$), assigned to the at least one second illumination angle ($\theta_{inc2}$), or at a corrected first aspecular measurement angle ($\theta_{as2}$), measured in relation to the Bragg angle ($\theta_{spec2}$), assigned to the at least one second illumination angle ($\theta_{inc2}$), wherein the corrected first aspecular measurement angle ($\theta_{as2}$) is obtained from the first aspecular measurement angle ($\theta_{as1}$) by correction in accordance with an optical refraction of the light that has changed at the at least one second illumination angle ($\theta_{inc2}$) as compared with the first illumination angle ($\theta_{inc1}$), carrying out an image analysis for the first and the at least one second image, detecting the interference pigment (103) within the first and the at least one second image by a spatially resolved analysis of the images, evaluating, calculating and/or simulating a respective remission spectrum for the first and the at least one second image, and identifying the interference pigment (103) on the basis of the spatial and spectral analysis and evaluation of the first image and the at least one second image, the first and the at least one second illumination angle ($\theta_{inc1}$, $\theta_{inc2}$) and the first aspecular measurement angle ($\theta_{as1}$) or the corrected first aspecular measurement angle ($\theta_{as2}$).

15. A nonvolatile, computer-readable medium, which comprises a computer program with program coding means which are designed to perform a method as claimed in claim 1 when the computer program runs on a computing unit.

16. A nonvolatile, computer-readable medium, which comprises a computer program with program coding means which are designed to perform a method as claimed in claim 9 when the computer program runs on a computing unit.

* * * * *

UNITED STATES PATENT AND TRADEMARK OFFICE
CERTIFICATE OF CORRECTION

PATENT NO. : 11,988,558 B2
APPLICATION NO. : 17/432609
DATED : May 21, 2024
INVENTOR(S) : Markus Mundus et al.

It is certified that error appears in the above-identified patent and that said Letters Patent is hereby corrected as shown below:

In the Claims

In Column 12, Line 19, Claim 1, delete "$\theta_{spec}$" and insert therefor -- $\theta_{spec1}$ --.

In Column 12, Line 20, Claim 1, delete ":," and insert therefor -- , --.

In Column 12, Line 22, Claim 1, insert a -- , -- after "($\theta_{inc2}$)".

In Column 12, Line 31, Claim 1, insert a -- , -- after "($\theta_{inc2}$)".

Signed and Sealed this
Twenty-fourth Day of September, 2024

Katherine Kelly Vidal
*Director of the United States Patent and Trademark Office*